US011136963B2

(12) United States Patent
Prins et al.

(10) Patent No.: US 11,136,963 B2
(45) Date of Patent: Oct. 5, 2021

(54) UNDERWATER ENERGY STORAGE SYSTEM

(71) Applicant: RIJKSUNIVERSITEIT GRONINGEN, Groningen (NL)

(72) Inventors: Wouter Adrianus Prins, Leeuwarden (NL); Marijn Van Rooij, Assen (NL); Antonios Iacovou Vakis, Groningen (NL); Bayu Jayawardhana, Groningen (NL)

(73) Assignee: RIJKSUNIVERSITEIT GRONINGEN, Groningen (NL)

( * ) Notice: Subject to any disclaimer, the term of this patent is extended or adjusted under 35 U.S.C. 154(b) by 0 days.

(21) Appl. No.: 16/770,870

(22) PCT Filed: Dec. 10, 2018

(86) PCT No.: PCT/NL2018/050828
§ 371 (c)(1),
(2) Date: Jun. 8, 2020

(87) PCT Pub. No.: WO2019/117711
PCT Pub. Date: Jun. 20, 2019

(65) Prior Publication Data
US 2020/0400123 A1    Dec. 24, 2020

(30) Foreign Application Priority Data

Dec. 11, 2017    (EP) .................................... 17206416

(51) Int. Cl.
*F03D 9/00*    (2016.01)
*F03D 9/17*    (2016.01)

(52) U.S. Cl.
CPC ............ *F03D 9/17* (2016.05); *F05B 2240/97* (2013.01); *F05B 2260/422* (2020.08)

(58) Field of Classification Search
CPC ......... F03D 9/17; H02K 7/1823; F03B 13/06; F03B 13/1885; F05B 2260/22; F05B 2240/95; F05B 2240/97
See application file for complete search history.

(56) References Cited

U.S. PATENT DOCUMENTS 4,321,475 A    3/1982    Grueb
9,951,747 B2    4/2018    Prins
(Continued)

FOREIGN PATENT DOCUMENTS

| CA | 2467287 A1 | 11/2005 |
| WO | 2015053615 A1 | 4/2015 |
| WO | 2016128962 A1 | 8/2016 |

*Primary Examiner* — Julio C. Gonzalez
(74) *Attorney, Agent, or Firm* — Pearne & Gordon LLP

(57) ABSTRACT

The invention provides an underwater energy storage system (UW-ES system) comprising a reservoir structure (5), which is resting at the bottom (4) of a waterbody (1), such as a sea, an ocean, a waterway, etc. The reservoir structure has a pressurizing reservoir (7A, 7B) with a deformable wall structure (17A, 17B) and a depressurizing reservoir (8A, 8B) with a rigid wall structure (6, 14, 18A, 18B), which are holding a working liquid (9) separated from the water (2) of the water body. Energy is stored and retrieved by displacing part of the working liquid from the depressurizing reservoir into the pressurizing reservoir, and vice versa, respectively. Therein use is made of the hydrostatic pressure of the water (2) acting on the deformable wall structure of the pressurizing reservoir. The UW-ES system is compact and economical, and allows for highly synergistical integration with various power take-off systems.

5 Claims, 2 Drawing Sheets

(56) References Cited

U.S. PATENT DOCUMENTS

| | | |
|---|---|---|
| 10,344,741 B2 | 7/2019 | Sant |
| 2016/0237980 A1* | 8/2016 | Prins ...................... F03B 15/02 |
| 2018/0030958 A1 | 2/2018 | Sant |

* cited by examiner

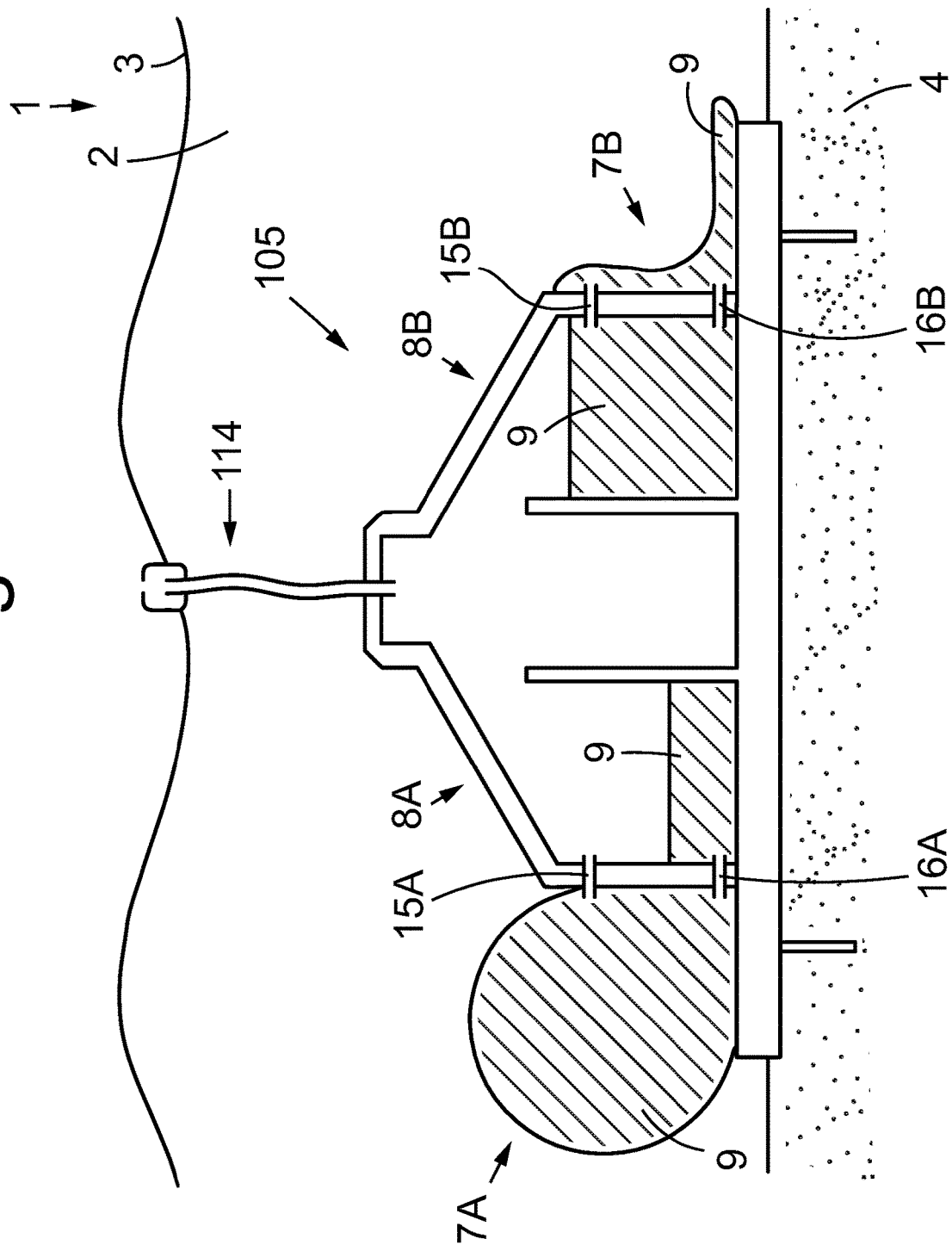

UNDERWATER ENERGY STORAGE SYSTEM

The invention relates to an underwater energy storage system for storing energy beneath the surface of a waterbody.

In the present context it is noted that the term "waterbody", as used throughout the present document, refers to a sea, an ocean, a waterway, or other similarly large water basin.

Furthermore, in the present document an underwater energy storage system is sometimes abbreviated as "UW-ES system".

An underwater energy storage system for storing energy beneath the surface of a waterbody is for example known from FIG. 1A of WO2015053615A1.

It is an object of the present invention to provide at least an alternative underwater energy storage system, which provides improvements over known underwater energy storage systems.

For that purpose, the invention provides an underwater energy storage system according to the appended independent claim 1. Preferable embodiments of the invention are provided by the appended dependent claims 2-5.

Hence, the invention provides an underwater energy storage system for storing energy beneath the surface of a waterbody, wherein the underwater energy storage system comprises a reservoir structure, which comprises a base structure by which the reservoir structure is resting at the bottom of the waterbody, and wherein the reservoir structure comprises a pressurizing reservoir and a depressurizing reservoir, each of which is being held relative to said base structure, and each of which is holding a working liquid beneath the surface of the waterbody and separated from the water of the waterbody, and wherein the pressurizing reservoir has a deformable wall structure and is arranged and configured for pressurizing the working liquid contained within the pressurizing reservoir by deformation of the deformable wall structure under influence of the hydrostatic pressure of the water acting on the deformable wall structure, and wherein the depressurizing reservoir has a rigid wall structure arranged and configured for shielding the working liquid within the depressurizing reservoir from pressurization under influence of the hydrostatic pressure of the water, and wherein the underwater energy storage system further comprises an energy storing subsystem configured for storing energy by means of increasing the potential energy of the working liquid within the reservoir structure by displacing part of the working liquid from the depressurizing reservoir into the pressurizing reservoir, as well as an energy retrieving subsystem configured for retrieving stored energy by means of decreasing the potential energy of the working liquid within the reservoir structure by releasing part of the working liquid to flow from the pressurizing reservoir into the depressurizing reservoir.

As compared to the underwater energy storage system known from FIG. 1A of WO2015053615A1, the present UW-ES system according to the present invention has a different reservoir structure. Major differences are that the reservoir structure of the present UW-ES system has the base structure by which it is resting at the bottom of the waterbody, and that it has the pressurizing reservoir with its deformable wall structure. Thanks to these differences, when storing and retrieving potential energy, the present UW-ES system is able to take advantage of the hydrostatic pressure, which is naturally available in the water of the waterbody, and which is acting on the deformable wall structure of the pressurizing reservoir. Thanks to the hydrostatic pressure, which is very powerful near the waterbody's bottom at which the reservoir structure is resting, the reservoir structure of the present UW-ES system can be built significantly more compact and significantly cheaper than the reservoir structure of the system known from FIG. 1A of WO2015053615A1. After all, said known system has the upper reservoir 2 and the lower reservoir 3, which are relatively voluminous. The reason why they are voluminous is that in said known system only hydrostatic pressure of the working liquid itself is involved in storing and retrieving potential energy. Said known system does not use the much higher hydrostatic pressure of the waterbody's water at all.

It is noted that other systems are known, which use a waterbody's water itself as the working liquid to be dispaced for storing and retrieving potential energy. In that sense these other known systems make use of hydrostatic pressure of the waterbody's water. However, these other known systems have the disadvantage that a waterbody's water will contaminate structural parts of these systems. In the UW-ES system according to the present invention, on the other hand, the working liquid is a conditioned working liquid, as it is held separated from the unconditioned water of the waterbody.

In a preferable embodiment of the invention, the underwater energy storage system further comprises an air duct structure, which is arranged and configured for providing air flow between the depressurizing reservoir and an air space above the surface of the waterbody. Thanks to the air duct structure it is possible to effect that the air pressure within the depressurizing reservoir will substantially stay at the atmospheric pressure level during the many various displacements of portions of the working liquid from the depressurizing reservoir to the pressurizing reservoir, and vice versa. Optionally it is possible to provide the air duct structure with controllable valve means and/or controllable air displacing devices in order to control the air pressure within the depressurizing reservoir to be at various other pressure levels, if desired.

In another preferable embodiment, the invention provides a power take-off and storage system, which not only comprises an underwater energy storage system according to the invention, but also a power take-off system, wherein the power take-off system is resting at the bottom of the waterbody by the base structure of the reservoir structure of the underwater energy storage system. Accordingly this preferable embodiment provides at least shared foundations at the bottom of the waterbody for both the underwater energy storage system and the power take-off system. This provides synergy with respect to the total installation and maintenance costs of both systems.

In another preferable embodiment of the invention, the power take-off and storage system is configured for storing, via said energy storing subsystem, energy provided by said power take-off system. This provides further synergy with respect to the total installation and maintenance costs of both systems.

In another preferable embodiment of the invention, the power take-off system of the power take-off and storage system is a wind turbine. Since a wind turbine requires relatively firm foundations, the abovementioned synergies with respect to the installation costs of both systems are exploited to the full. Accordingly, the present invention allows to provide a compact wind turbine system combined with an integrated in-situ energy storage system. This combined system of a wind turbine system and an energy storage system not only has optimal installation and maintenance costs of the two systems, but also provides optimal operational energy economy, as the wind energy is storable right at the place where it is harvested, usually at off-shore locations.

The abovementioned aspects and other aspects of the invention will be apparent from and elucidated with reference to the embodiments described hereinafter by way of non-limiting examples only and with reference to the schematic figures in the enclosed drawing.

FIG. 2 shows, in a cross-sectional view similar to that of FIG. 1, an example of a specific embodiment of the abovementioned air duct structure for use in underwater energy storage systems according to the invention.

Figure 1:
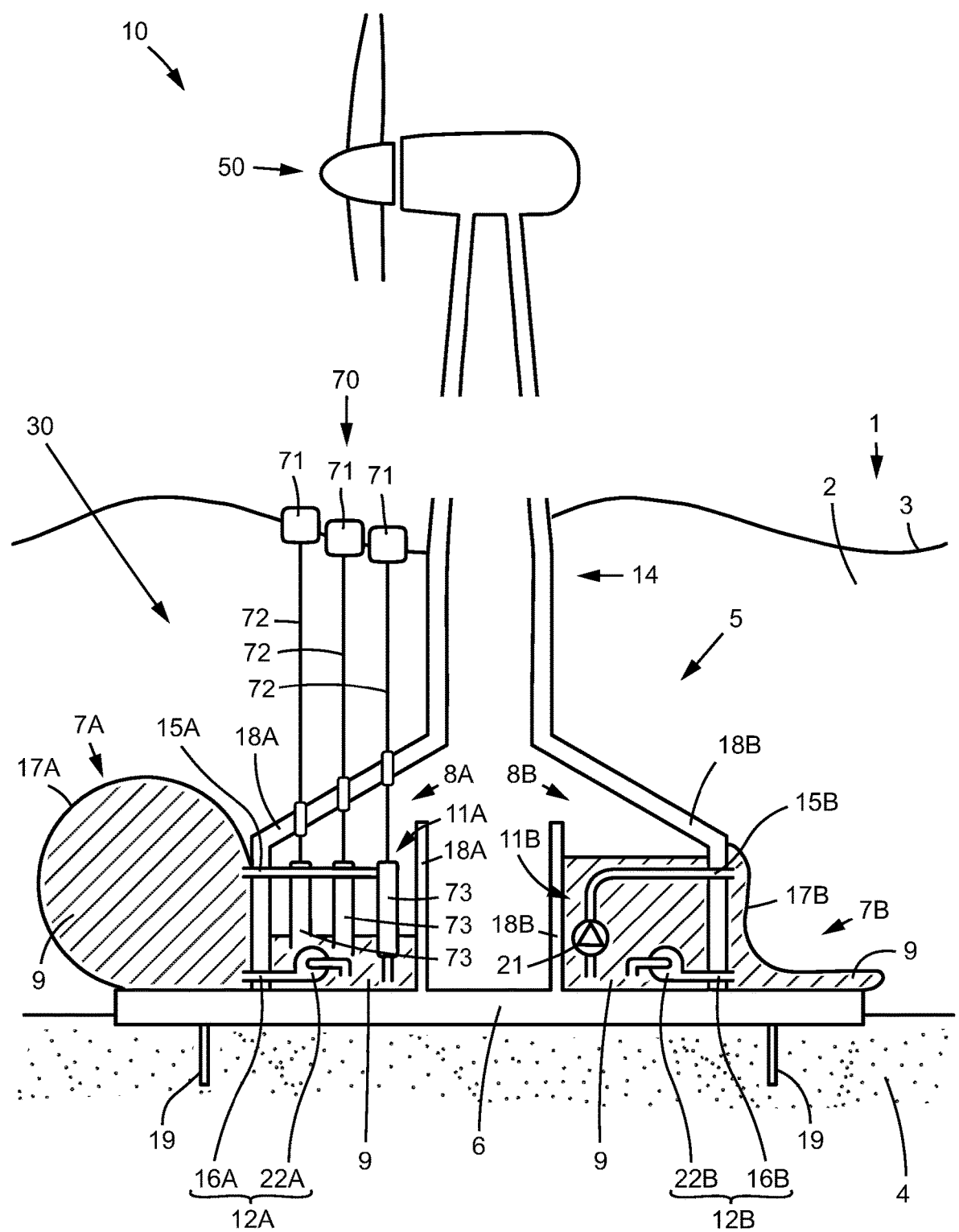
FIG. 1 shows, in a cross-sectional view, an example of an embodiment of an underwater energy storage system according to the invention.

The reference signs used in FIGS. 1 and 2 are referring to the abovementioned parts and aspects of the invention, as well as to related parts and aspects, in the following manner.

1 waterbody
2 water of the waterbody
3 surface of the waterbody
4 bottom of the waterbody
5; 105 reservoir structure
6 base structure
7A, 7B pressurizing reservoir
8A, 8B depressurizing reservoir
9 working liquid
10 power take-off and storage system
11A, 11B energy storing subsystem
12A, 12B energy retrieving subsystem
14; 114 air duct structure
15A, 15B energy storing conduit
16A, 16B energy retrieving conduit
17A, 17B deformable wall structure
18A, 18B rigid wall structure
19 anchoring system
21 pump
22A, 22B turbine
30 underwater energy storage (UW-ES) system
50 power take-off system (wind turbine)
70 power take-off system (surface wave energy extractor)
71 float
72 hoist line
73 liquid guiding structure In FIGS. 1 and 2 sometimes the same reference numerals have been used for parts and aspects which are alike for the different embodiments of FIGS. 1 and 2.

Based on the above introductory description, including the brief description of the drawing figures, and based on the above-explained reference signs used in the drawing, the shown examples of FIGS. 1 and 2 are for the greatest part readily self-explanatory. The following extra explanations are given.

Reference is first made to the shown example of FIG. 1. Therein the underwater energy storage system 30 (UW-ES system 30) is shown as part of the power take-off and storage system 10. The power take-off and storage system 10 further comprises the two power take-off systems 50 and 70. The power take-off system 50 is a wind turbine. The power take-off system 70 is a surface wave energy extractor, which is arranged and configured for extracting kinetic energy from surface waves of the waterbody 1 in a manner similar to the manners described in the abovementioned document WO2015053615A1. Accordingly, the working of the surface wave energy extractor 70 is not discussed in detail herein. Here it is simply noted that FIG. 1 shows a plurality of floats 71, hoist lines 72 and liquid guiding structures 73, which are similar to the floats 9, hoist lines 28 and liquid guiding structures 52, respectively, of the system 1 shown in FIG. 3 of WO2015053615A1.

The base structure 6 of the reservoir structure 5 of the UW-ES system 30 is a rigid watertight floor, which is anchored relative to the bottom 4 of the waterbody 1 by the anchoring system 19, such as for example an anchoring skirt 19.

The reservoir structure 5 comprises the two (mutually similar) pressurizing reservoirs 7A and 7B, as well as the two corresponding (mutually similar) depressurizing reservoirs 8A and 8B, respectively. The pressurizing reservoirs 7A and 7B have the deformable wall structures 17A and 17B, respectively, which are of the bladder type. The depressurizing reservoirs 8A and 8B have the rigid wall structures 18A and 18B, respectively. Additionally the rigid base structure 6 and the rigid air duct structure 14 function as parts of the rigid wall structures of the depressurizing reservoirs 8A and 8B.

As seen in the lower left part of FIG. 1, the UW-ES system 30 further comprises the energy storing subsystem 11A and the energy retrieving subsystem 12A, which correspond to the pressurizing reservoir 7A and the depressurizing reservoir 8A. Furthermore, as seen in the lower right part of FIG. 1, the UW-ES system 30 comprises the energy storing subsystem 11B and the energy retrieving subsystem 12B, which correspond to the pressurizing reservoir 7B and the depressurizing reservoir 8B.

As seen in the lower left part of FIG. 1, the energy storing subsystem 11A comprises the energy storing conduit 15A, via which part of the working liquid 9 can be displaced from the depressurizing reservoir 8A into the pressurizing reservoir 7A. This displacement of the working liquid 9 has to be done against the action of the hydrostatic pressure of the water 2 acting on the deformable bladder reservoir 7A. The energy for carrying out this displacement of the working liquid 9 is provided by the action of the surface wave energy extractor 70.

As further seen in the lower left part of FIG. 1, the energy retrieving subsystem 12A comprises the energy retrieving conduit 16A and the turbine 22A, via which part of the working liquid 9 can flow from the pressurizing reservoir 7A into the depressurizing reservoir 8A. This flow of the working liquid 9 is created by the action of the hydrostatic pressure of the water 2 acting on the deformable bladder reservoir 7A. The turbine 22A serves to generate electrical energy from this flow of the working liquid 9.

As seen in the lower right part of FIG. 1, the energy storing subsystem 11B comprises the energy storing conduit 15B, via which part of the working liquid 9 can be displaced from the depressurizing reservoir 8B into the pressurizing reservoir 7B. This displacement of the working liquid 9 has to be done against the action of the hydrostatic pressure of the water 2 acting on the deformable bladder reservoir 7B. The energy for carrying out this displacement of the working liquid 9 is provided by the action of the pump 21, which is driven by energy provided by the wind turbine 50.

As further seen in the lower right part of FIG. 1, the energy retrieving subsystem 12B comprises the energy retrieving conduit 16B and the turbine 22B, via which part of the working liquid 9 can flow from the pressurizing reservoir 7B into the depressurizing reservoir 8B. This flow of the working liquid 9 is created by the action of the hydrostatic pressure of the water 2 acting on the deformable bladder reservoir 7B. The turbine 22B serves to generate electrical energy from this flow of the working liquid 9.

In the situation of FIG. 1, the pressurizing reservoir 7A is shown in a relatively expanded condition, while the other pressurizing reservoir 7B is shown in a relatively collapsed condition. In correspondence therewith, the depressurizing reservoir 8A contains a relatively small amount of the working liquid 9, while the other depressurizing reservoir 8B contains a relatively large amount of the working liquid 9.

The UW-ES system 30 of FIG. 1 has the air duct structure 14, which is arranged and configured for providing air flow between the depressurizing reservoirs 8A and 8B and an air space above the surface 3 of the waterbody 1. In the example of FIG. 1 the air duct structure 14 is a rigid, shaft-type air duct structure. The shaft is usable to give access to the interior of the reservoir structure 5 for maintenance and the like, for example by means of an elevator, stairs, or the like, installed and attached in the interior of the shaft.

In the example of FIG. 1 the wind turbine 50 is resting at the bottom 4 of the waterbody 1. This is realized via the base structure 6 of the reservoir structure 5.

Reference is now made to FIG. 2, which shows the air duct structure 114, which differs from the air duct structure 4 of FIG. 1. The air duct structure 114 is not of the rigid, shaft-type. Instead, the air duct structure 114 comprises a flexible hose, which is kept floating at the surface 3 of the waterbody 1 by a buoy.

While the invention has been described and illustrated in detail in the foregoing description and in the drawing figures, such description and illustration are to be considered exemplary and/or illustrative and not restrictive; the invention is not limited to the disclosed embodiments.

For example, in the shown examples the deformable wall structures of the pressurizing reservoir are of the bladder type. However, many various other deformable wall structures of such a pressurizing reservoir may be applied, such as for example deformable wall structures which are extendible and contractable in a telescopic manner.

As another example, in the shown examples the base structure of the reservoir structure of the UW-ES system is resting at the bottom 4 of the waterbody 1 with the help of anchoring means 19. Alternatively, mooring of the reservoir structure may also be accomplished only by the weight of the reservoir structure or of the larger UW-ES system or of the yet larger power take-off and storage system.

As yet another example, in the shown examples the energy storing subsystem 11A and the energy retrieving subsystem 12A are formed by two mutually separate constructions, respectively, while also the energy storing subsystem 11B and the energy retrieving subsystem 12B are formed by two mutually separate constructions, respectively. Alternatively, a single construction may fulfill the functions of both the energy storing subsystem and the energy retrieving subsystem. For example, a known and so-called reversible hydroelectric turbine, which can operate both as a turbine-generator and, in reverse, as an electric motor-driven pump, may be applied to fulfill the functions of both such an energy retrieving subsystem and such an energy storing subsystem, respectively.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single part may fulfill the functions of several items recited in the claims. For the purpose of clarity and a concise description, features are disclosed herein as part of the same or separate embodiments, however, it will be appreciated that the scope of the invention may include embodiments having combinations of all or some of the features disclosed. The mere fact that certain measures are recited in mutually different dependent claims does not indicate that a combination of these measures can not be used to advantage. Any reference signs in the claims should not be construed as limiting the scope.

The invention claimed is:

1. A power take-off and storage system comprising:
   a power take-off system; and
   an underwater energy storage system for storing energy beneath the surface of a waterbody,
   wherein the underwater energy storage system comprises;
   a reservoir structure, which comprises a base structure by which the reservoir structure is resting at the bottom of the waterbody, and wherein the reservoir structure comprises a pressurizing reservoir and a depressurizing reservoir, each of which is being held relative to said base structure, and each of which is holding a working liquid beneath the surface of the waterbody and separated from the water of the waterbody, and wherein the pressurizing reservoir has a deformable wall structure and is arranged and configured for pressurizing the working liquid contained within the pressurizing reservoir by deformation of the deformable wall structure under influence of the hydrostatic pressure of the water acting on the deformable wall structure, and wherein the depressurizing reservoir has a rigid wall structure arranged and configured for shielding the working liquid within the depressurizing reservoir from pressurization under influence of the hydrostatic pressure of the water;
   an energy storing subsystem configured for storing energy by means of increasing the potential energy of the working liquid within the pressurizing reservoir and the depressurizing reservoir by displacing part of the working liquid from the depressurizing reservoir into the pressurizing reservoir; and
   an energy retrieving subsystem configured for retrieving stored energy by means of decreasing the potential energy of the working liquid within the pressurizing reservoir and the depressurizing reservoir by releasing part of the working liquid to flow from the pressurizing reservoir into the depressurizing reservoir;
   wherein the power take-off system is resting at the bottom of the waterbody by the base structure of the reservoir structure of the underwater energy storage system.

2. The power take-off and storage system according to claim 1, further comprising an air duct structure, which is arranged and configured for providing air flow between the depressurizing reservoir and an air space above the surface of the waterbody.

3. The power take-off and storage system according to claim 1, wherein the power take-off and storage system is configured for storing, via said energy storing subsystem, energy provided by said power take-off system.

4. The power take-off and storage system according to claim 1, wherein the power take-off system is a wind turbine.

5. The power take-off and storage system according to claim 3, wherein the power take-off system is a wind turbine.

* * * * *